Patented June 30, 1931

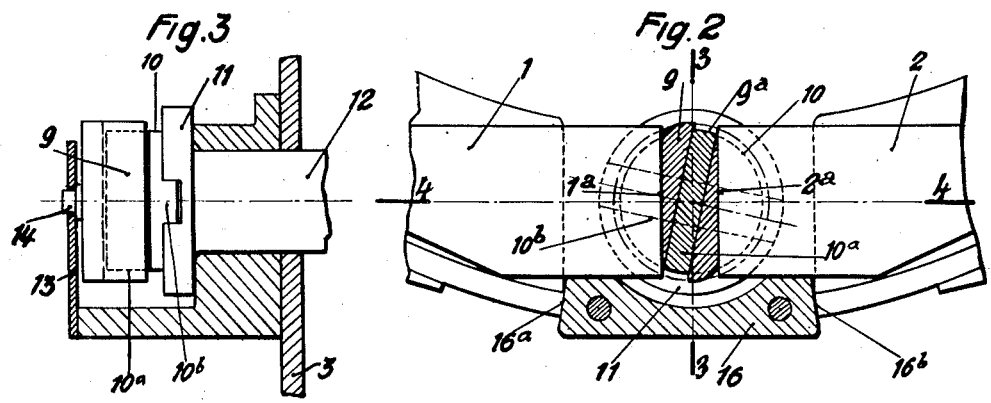
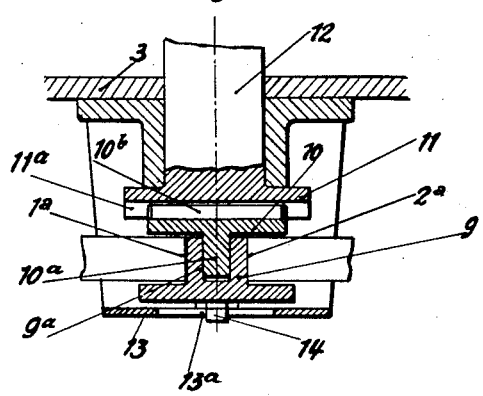
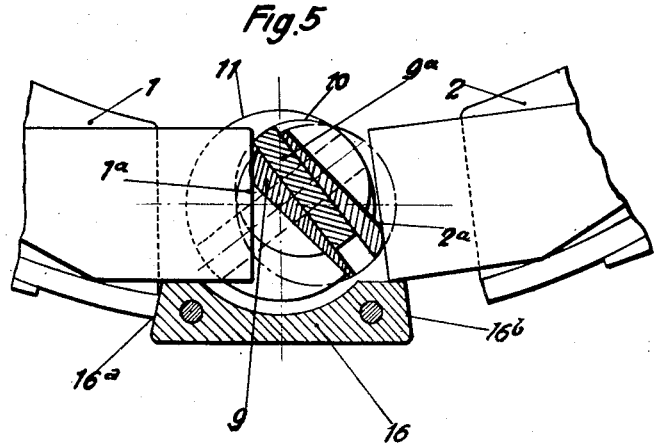

1,812,551

UNITED STATES PATENT OFFICE

EDOUARD POULET, OF COURBEVOIE, FRANCE

BRAKE FOR MOTOR VEHICLES  REISSUED

Application filed February 21, 1929, Serial No. 341,669, and in Belgium February 28, 1928.

The present invention relates to a brake for motor vehicles so constructed as to be able to operate both for forward and reverse running, and under conditions of safety and of smoothness of operation which are not to be encountered in any of the systems heretofore known.

In the double segment brakes and in the so-called simple or double auto-braking or servo-braking brakes acting in the two directions of rotation, it has been customary to employ a controlling cam device centering itself automatically between more or less worn out segments, for the purpose of always obtaining uniform wedging or tightening action upon the ends of the brake segment or segments.

The cam which is the mostly employed, namely an oblique pin which is movable in a cylindrical part, will give satisfaction as regards simplicity and operation. However it shows a somewhat great disadvantage due to its large diameter which does not allow important rectilinear displacements for a given angular movement.

The present invention has for its object a device which entirely does away with this inconvenience, the said device consisting essentially in a cam which can be of a very small thickness and which is slidably mounted, through the medium of an also slidable member, upon a plate constituting the controlling or actuating spindle.

On the other hand, in order to avoid, in the use of a free cam of this kind, that a badly directed braking stress or a badly effected return may cause an undue movement of the beginning of the segment resulting in the insantaneous opening producing a sudden stopping, the invention comprises a system of guiding in a tangential direction consisting in a stop which is so arranged that every radial motion of the ends of the segment is made impossible.

A brake made according to the invention is represented substantially, but by way of example only, in the accompanying drawings in which:

Fig. 2 is a section showing the cam in the position ready for use.

Fig. 3 is a vertical section on line 3—3 of Fig. 2.

Fig. 4 is a horizontal section on line 4—4 of Fig. 2.

Fig. 5 shows in section the cam in the tightening or application position.

Figure 1:
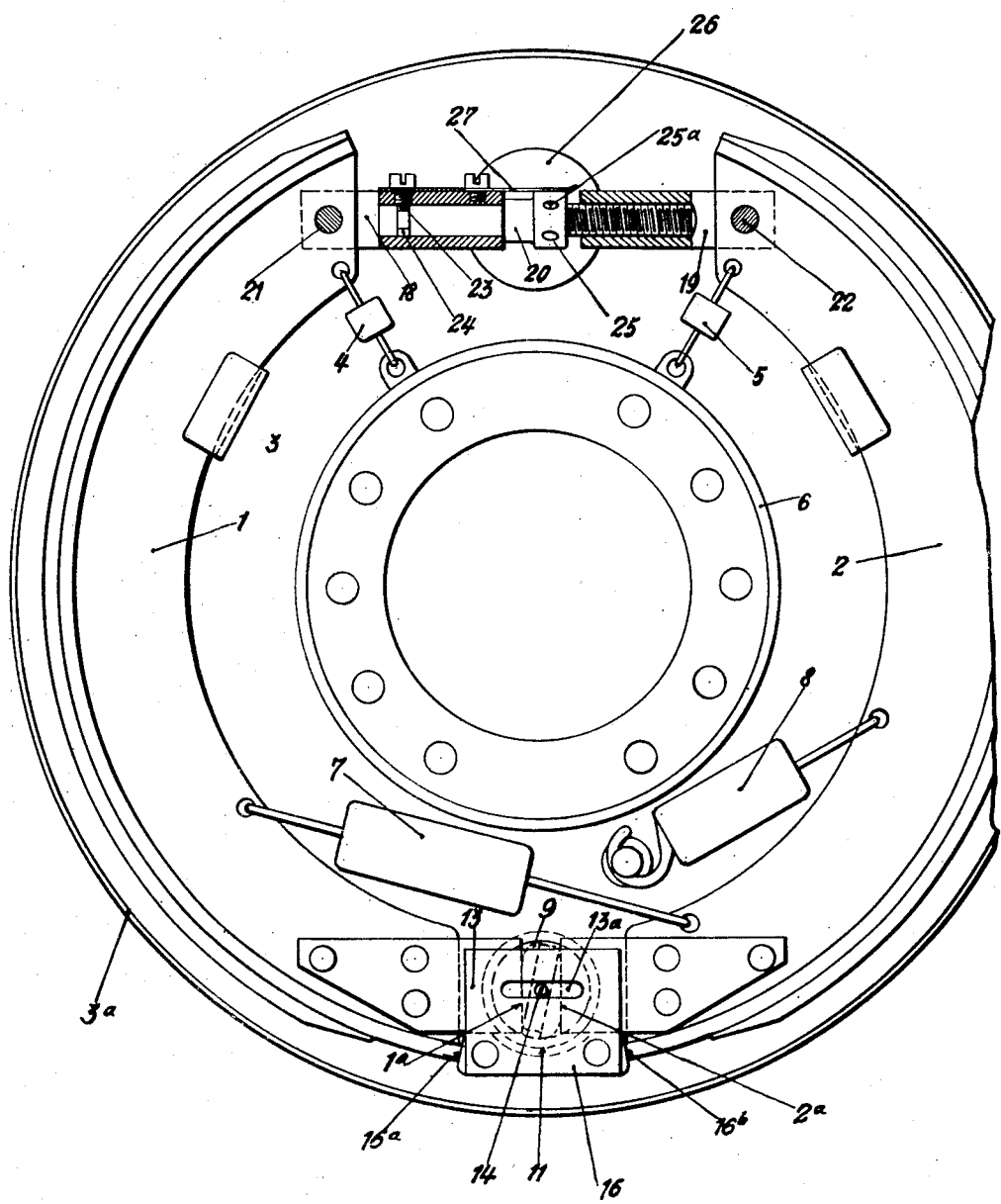
Fig. 1 is a front view, partly in section, of the whole of the brake in the position ready for use.

In the embodiment shown in the drawings, the brake made according to the invention, comprises two parts of a segment 1—2 connected together by means of a system of adjustable caps and the two free ends of which are subjected to the action of the braking cam. This whole device is disposed and maintained concentrically to the rim $3^a$ of the brake drum or barrel 3 by means of springs 4—5 fixed, on the other hand, to a central ring 6 secured to the plate 3, of the spring 7 which connects the two parts of the segment, towards their ends, and of the spring 8 which connects one of the parts of the segment to the plate 3.

The braking cam consists of a cam 9 the thickness of which can be very much reduced. The said cam 9 is provided with a guide $9^a$ enclosing the slide $10^a$ of an intermediate part 10 upon which the same can thus slide and which is provided, upon its other face, with a slide $10^b$ forming a right angle with the slide $10^a$, the said slide $10^b$ being engaged in the guide $11^a$ of the plate 11 secured to the driving shaft 12. A stationary plate 13 disposed in front of the cam 9 is provided with a horizontal slot $13^a$ in which is movably mounted the pin 14 forming the center of the said cam 9. It will be understood that, under these conditions, the cam 9, the center of which cannot depart from the horizontal plane, will be left entirely free to move laterally so as to center itself automatically between the ends of the brake segment, without ceasing for the said reason to be always under the positive dependence of the driving shaft.

In virtue of this arrangement, the organ which is situated between the ends of the brake segment for the purpose of causing them to move apart, consists in a very flat cam which, in the position of rest, is placed parallelly to the shoes upon which the said cam is to act so that the angular displacements of the driving shaft will result in important rectilinear displacements of the said shoes constituting the ends of the brake segments. In order to avoid, in a device of this kind owing to the entire freedom of motion of the segment relatively to the brake drum, that a radial displacement of the segment ends may cause the undue carrying along motion to the start or beginning of this brake segment, the said ends $1^a$—$2^a$ of the brake segment bear upon a guiding stop 15 secured to the plate 3. Under the action of the braking cam 9, the said ends of the brake segment cannot consequently move except in the tangential direction, whilst any radial movement of same is made impossible.

This stationary stop 16 is disposed in such manner that, when at rest, the ends of the brake segments bear at $16^a$—$16^b$ upon the sides of the said stop. The result is that when, during the braking, the segment is driven at the one or the other of its ends, according to the direction in which the vehicle is moving, there will be no shock of the other end of the said segment against a stationary stop.

I claim:

A brake for motor vehicles operating in both directions of running, comprising in combination in a brake drum: two brake segment parts connected together through an arrangement of adjustable caps; a stationary stop which maintains in the radial direction and guides in the tangential direction the two ends of the said two parts of brake segments; a cam disposed between the said ends of the said brake segment parts, and an intermediate part upon which slides the said cam; the said intermediate part of itself sliding perpendicularly to the direction of sliding of the cam in a plate connected with the driving shaft.

In testimony whereof I affix my signature.

EDOUARD POULET.